US000001380H

United States Statutory Invention Registration [19]

[11] Reg. Number: H1380

Halila et al. [43] Published: Dec. 6, 1994

[54] COMBUSTOR LINER COOLING SYSTEM

[76] Inventors: Ely E. Halila, 9447 Bluewing Ter., Cincinnati, Ohio 45241; Howard L. Foltz, 8361 Taffy Dr., West Chester, Ohio 45069

[21] Appl. No.: 687,111

[22] Filed: Apr. 17, 1991

[51] Int. Cl.[5] ..... F02G 3/00; F23R 3/04

[52] U.S. Cl. ..... 60/757; 60/39.32

[58] Field of Search ..... 60/757, 39.32

[56] References Cited

U.S. PATENT DOCUMENTS 4,567,730 2/1986 Scott ..... 60/757

4,916,906 4/1990 Vogt ..... 60/757

*Primary Examiner*—David Brown

[57] ABSTRACT

A gas turbine engine combustor cooling system for imperforate non-metallic combustor liners has a wall positioned adjacent to the liners forming therewith a cavity. The wall has a plurality of inlets for admitting cooling air into the cavity and a plurality of outlets for exhausting the cooling air into a separate passageway after it impinges the liners. The exhausted cooling air is transferred upstream of the liner where it is combined with fuel for burning rather than discharged downstream as cooling film.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMBUSTOR LINER COOLING SYSTEM

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention relates to gas turbine engine combustors and more specifically to an improved combustor liner cooling system for achieving high combustion operating temperatures and efficiencies.

Conventional combustor cooling systems typically employ a set pattern of small diameter cooling holes drilled at an angle through the liner thickness. Cooling air passes through the holes, convectively cooling across the hole surfaces, and then exits into the main combustion gas stream as film, further enhancing the cooling effectiveness of the system.

As combustor and coolant temperature requirements increase in higher performance engines, the amount of film required to cool a metallic liner material also increases. Since the film does not contribute to burning in the combustor, the arrangement reduces the level of combustion temperature rise within the burner and stoichiometric temperatures are not achieved. With less air available for mixing with the fuel, there are reductions in combustor efficiency levels and engine performance.

Due to the temperature limitations of metal liners, composite or non-metallic liner materials having high temperature/strength capabilities relative to metals are being investigated. Materials such as carbon/carbon or ceramic matrix composite are strong candidates. However, a major disadvantage of carbon/carbon material is that if small cooling holes are drilled through the thickness, the carbon fibers will oxidize, resulting in ash with zero fiber strength.

Alternate techniques for cooling are convective cooling the backside of the combustor liner using air convection or impingement cooling. Backside convective cooling results in a hot surface temperature exceeding the material strength and temperature capabilities, and inadequate pressure to inject the air within the combustion zone area due to the high pressure drop assaciated with maintaining adequate air velocity for high convection heat transfer. Impingement cooling results in surface temperatures that are within the acceptable limits for carbon/carbon material, while also allowing adequate pressure to inject the cooling air into the flow stream. In this type of a system, the spent cooling air exits through holes in the liner. However, for the reasons stated above, the use of holes in a carbon/carbon material liner has drawbacks. Without an available exit, the spent impingement cooling air wi11 create a cross-flow condition which could reduce the cooling effectiveness of the system. The cooling effectiveness reductions may be large enough to cause an increase in liner temperatures which would exceed the material's temperature and strength capabilities.

U.S. Pat. No. 4,567,730 to Scott discloses a shielded combustor having liners made of non-metallic material such as ceramic or carbon/carbon capable of withstanding elevated temperatures. A plurality of cooling air apertures disposed in an outer shell channel high-speed jets of impingement cooling air upon the outer surface of the liners. A portion of the cooling air may flow through an optional dilution aperture in the liners into the combustion zone, and another portion is discharged downstream as film cooling.

Another prior art combustor cooling system is disclosed in U.S. Pat. No. 4,916,906 to Vogt. Method and apparatus are disclosed for providing breach cooling of an imperforate wall combustor liner. The breach cooling is effected by structure for channeling a cooling fluid such as a jet toward an outer surface of the imperforate wall, with the jet having sufficient momentum to breach a boundary layer of the cooling fluid which forms over the wall outer surface for more effective cooling. In an exemplary embodiment, the breach-cooled wall is an upstream portion of the gas turbine engine combustor, and the inner surface of the combustor liner facing the combustion gases is characterized by not having a film-cooling boundary layer of air to reduce quenching of the combustion gases for reducing exhaust emissions.

In the Scott and Vogt combustors, spent cooling air after impinging upon the combustor liner is discharged downstream as film cooling. In an integrated high performance turbine engine application, it would be advantageous to use substantially all the available air in the combustor for burning and thereby improve combustion efficiency while reaching stoichiometric combustion temperatures. Stoichiometric temperature refers to the maximum achievable gas temperature. The more available air to the combustor that is used for mixing with the fuel, the better the combustor efficiency. Conversely, as more available air to the combustor is used for cooling, the mere difficult it is to achieve stoiciometric temperature. In designing high thrust to weight ratio engines, higher combustor temperatures generally translate into higher thrust improvement for the same size engine.

It would therefore be desirable to provide a combustor cooling system in which cooling air after impinging upon an imperforate liner is transferred upstream to the combustion dome area for combining with fuel for burning.

SUMMARY OF THE INVENTION

It is an object of the invention to provide a gas turbine engine combustor capable of operating at high temperatures and at high combustion efficiencies.

It is another object of the invention to provide a combustion liner cooling system in which the flow of impingement cooling air is not subject to cross-flow degradation.

It is another object of the invention to provide a combuster liner cooling system in which cooling air used to cool the liners is transferred upstream to the combustor dome for combining with fuel for burning.

It is another object of the invention to provide a combustor liner cooling system which utilizes substantially all the air available in the combustor is used for burning, thereby increasing combustion temperatures and improving combustion efficiency.

According to the invention a combustor is disclosed having outer and inner combustor liners joined at the upstream ends thereof to a combustor dome and defining a combustion zone therebetween. One or more carburetors in the combustor dome provide a fuel/air mixture for burning in the combustion zone. The combustor liners are imperforate and preferably made of non-metallic material capable of withstanding high temperatures of up to 2700° F. Each of the liners is cooled by jets of impingement cooling air fed through an outer wall forming with the liner an elongated cavity. The wall has a plurality of inlets for admitting the cooling air into the cavity and a plurality of outlets for exhausting the cooling air without mixing with each other and causing cross-flow degradation. After impinging the liner, the cooling air exits the cavity and is transferred along a passageway to the combustor dome where it is combined with the fuel/air mixture from the carburetors for burning. The passageway is preferably comprised of a corrugated wall in which the corrugations form a plurality of paths for conducting the exhausted cooling air to the combustor dome. By combining the exhausted cooling air with the fuel, as opposed to discharging it as film, higher temperatures and combustion efficiency can be realized.

Other features and advantages of the invention will be apparent from the following description and claims, and are illustrated in the accompanying drawings which show an embodiment of the invention.

DETAILED DESCRIPTION

Figure 1:
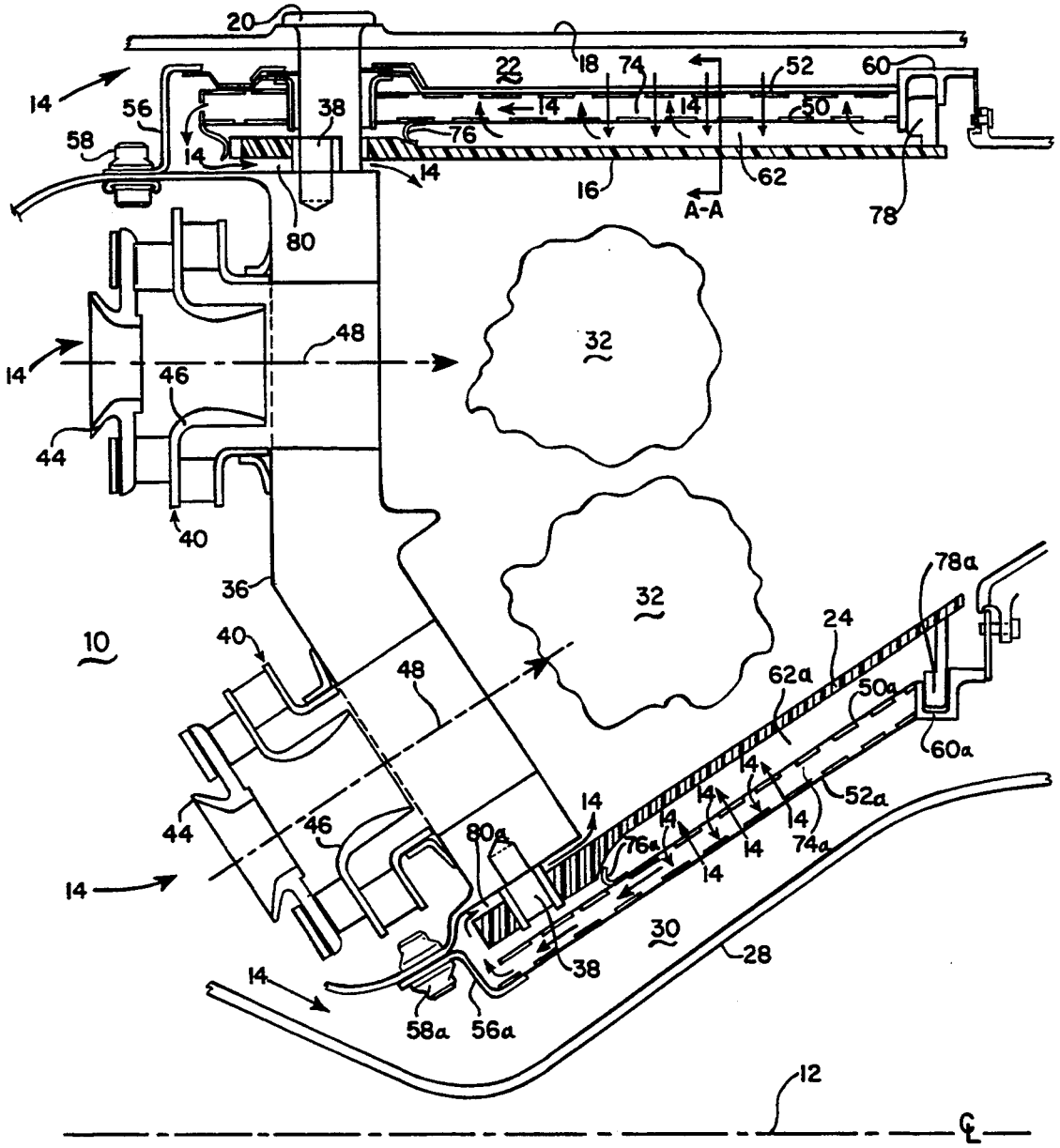
FIG. 1 is a sectional view of a gas turbine engine combustor liner cooling system according to the present invention.

The combustor liner cooling system according to the present invention is shown in FIG. 1 which illustrates an annular gas turbine combustor 10 disposed concentrically about an engine centerline axis 12. Upstream of the combustor 10 is a compressor (not shown) for providing compressed air or other cooling fluid 14 to the combustor 10. The combustor 10 includes an annular outer liner 16 spaced from an annular casing 18 by a fastener 20 to define an annular first passage 22 therebetween for receiving a portion of the air 14. The combustor 10 also includes an annular inner liner 24 spaced from an inner casing 28 to define an annular second passage 30 therebetween for receiving a portion of the air 14. The inner liner 24 is spaced from the outer liner 16 to define one or more combustion zones 32 therebetween. The combustor 10 has an annular combustor dome 36 fixedly attached to the upstream ends of outer and inner liners 16,24 by fasteners 38. The combustor dome 36 supports dual carburetors 40 each having an airhorn 44 connected to a counter-rotating swirler assembly 46. In the embodiment of FIG. 1, dual carburetors are employed, however, it is understood to those skilled in the art that the invention may be operated with one or more carburetors. Fuel discharged from an injector (not shown) into the swirler assembly 46 is mixed with air 14 to create an atomized fuel/air mixture 48 which is discharged from the carburetors 40 into the combustion zones 32 where it is burned. Exhaust gases generated from the burning fuel/air mixture travel downstream and are discharged from the combustor 10 into a turbine (not shown).

Outer and inner liners 16,24 are preferably made of high temperature resistant non-metallic material such as carbon/carbon or a ceramic matrix composite. Spaced outwardly from the liners 16,24 are annular impingement walls **50,50*a* to which are attached annular corrugated walls 52,52*a*. The impingement walls 50,50*a* and corrugated walls 52,52*a* are secured at the upstream ends to the combustor dome 36 by clamps 56,56*a* and fasteners 58,58*a* and at the downstream ends by brackets 60,60*a*. The outer and inner liners 16,24 and impingement walls 50,50*a* are separated from each other to define therebetween elongated cavities 62,62*a***.

Figure 2:
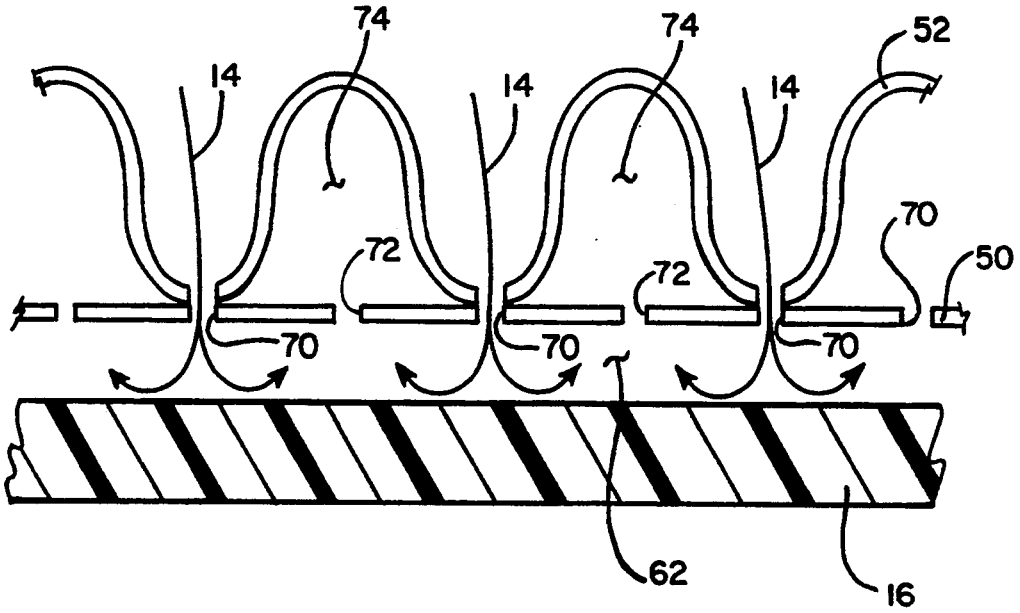
FIG. 2 is an end sectional view taken along line A—A of FIG. 1.

FIG. 2 is an enlarged cross-sectional view of the cooling system for outer liner 16. It will be understood to those skilled in the art that the cooling system for inner liner 24 is identical in operation, and therefore the following description also pertains to inner liner 24. Holes 70 are provided in the impingement wall 50 and corrugated wall 52 and aligned with each other at locations where the corrugations in corrugated wall 52 are in contact with the impingement wall 50. Additional holes 72 are provided in impingement walls 50 at locations where the corrugations do not contact the impingement wall 50.

Referring also to FIG. 1, air 14 in first and second annular passageways 22,30 is admitted into elongated cavities **62,62*a* through the aforementioned holes 70 as jets of cooling air and impinge upon outer and inner liners 16,24. After impingement, the air 14 exits cavities 62,62*a* through holes 72 into passageways 74,74*a* defined by the corrugations in corrugated wa11s 52,52*a* and the impingement walls 50,50*a*. The upstream end of elongated cavities 62,62*a* are closed by seals 76,76*a* and at the downstream end the cavities are closed by seals 78,78*a*. One end of seals 78,78*a* is attached to the liners 16,24 and the other end is slidably housed within brackets 60,60*a* a to allow for flexure of the liners during operation. This arrangement minimizescross-flow and uncontrolled leakage of air 14 within the cavities 62,62*a*. After impingement, air 14 flows along the passageways 74,74*a* to the upstream ends thereof where it exits the end of the corrugated walls 52,52*a* and passes through spaces 80,80*a* between the outer and inner liners 16,24 and combustor dome 36. Thus, the passageways 74,74*a* provide a path for the air 14 used for cooling the liners 16,24 without mixing with incoming air, and transfers the air 14 used for cooling to the forward section of the combustor, where it is injected into the combustor burning zones 32 containing the fuel/air mixture 48 from carburetors 40. In this manner, the invention utilizes substantially all the air 14 in the combustor 10** for burning and thereby improves combustion efficiency.

While preferred features of the invention are embodied in the structure illustrated herein, it is understood that changes and variations may be made by those skilled in the art without departing from the spirit and scope of the invention.

We claim:

1. 1. A combustor for a gas turbine engine, comprising:

an outer liner;

an inner liner spaced from said outer liner to define a combustion zone therebetween;

a dome joined to upstream ends of said inner and outer liners;

carburetor means disposed in said dome for providing a fuel/air mixture to said combustion zone; and means for impingement cooling said inner and outer liners, said means including an outer wall positioned along each said inner and outer liners and forming a cavity therewith, said wall having a plurality of inlets for admitting cooling air into said cavity and a plurality of outlets for exhausting said cooling air from said cavity, and a passageway means for conducting said cooling fluid from said outlets to said dome for mixing with said fuel/air mixture.

2. The combustor of claim 1, wherein said passageway means comprises a corrugated wall defining a plurality of paths for said cooling air along the length of the corrugations.

3. The combustor of claim 2, wherein said outer and inner liners are made of non-metallic material. ( 4. The combustor of claim 3, wherein said outer and inner liners are made of carbon/carbon material.

5. The combustor of claim 3, wherein said outer arid inner liners are made of a ceramic matrix composite.

* * * * *